(12) United States Patent
Pavlath et al.

(10) Patent No.: US 6,711,342 B2
(45) Date of Patent: Mar. 23, 2004

(54) OPTICAL RANDOM NUMBER GENERATOR AND METHOD OF OPTICALLY GENERATING RANDOM NUMBERS

(75) Inventors: George A. Pavlath, Thousand Oaks, CA (US); Lawrence E. Bean, Lake Forest, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 0 days.

(21) Appl. No.: 10/157,291

(22) Filed: May 29, 2002

(65) Prior Publication Data

US 2003/0223729 A1 Dec. 4, 2003

(51) Int. Cl.[7] ................................................ G02G 6/00
(52) U.S. Cl. ........................................ 385/147; 356/450
(58) Field of Search ............................. 385/147, 39, 27; 356/450

(56) References Cited

U.S. PATENT DOCUMENTS 6,263,146 B1     7/2001  Umeno et al.
6,321,009 B1 *  11/2001  Klein Koerkamp .......... 385/45
6,609,139 B1 *   8/2003  Dultz et al. ................. 708/250

2003/0118346 A1 *  6/2003  Umeno et al. .............. 398/140

FOREIGN PATENT DOCUMENTS

EP       1174759 A1 *  1/2002  ............. G02F/3/00
JP     2001013532 A  *  1/2001  ............. G02F/1/35

* cited by examiner

*Primary Examiner*—Hemang Sanghavi
*Assistant Examiner*—Scott A Knauss

(57) ABSTRACT

A system and method for optically generating random numbers in a chaotic manner using an optical random number generator. The optical random number generator includes an optical interferometer having a chaotic output which is dependent upon temperature fluctuations in its surrounding micro-environment. The interferometer receives light from a light source, splits the received light between a pair of temperature-sensitive optical paths, and interferes the split light traveling on the pair of optical paths to generate an output signal. The power of the interferometer output signal is measured and compared with a threshold value in order to generate a random number based on the measured interferometer output power. Chaotic behavior in the interferometer output power is achieved by making the interferometer phase shift extremely sensitive to temperature fluctuations, where small changes in the temperature of the interferometer microenvironment will alter the output power of the interferometer.

22 Claims, 4 Drawing Sheets

OPTICAL RANDOM NUMBER GENERATOR AND METHOD OF OPTICALLY GENERATING RANDOM NUMBERS

BACKGROUND OF THE INVENTION

1. Field of the Invention

This invention relates to an apparatus for optically generating chaotic random numbers.

2. Description of Related Art

Certain applications require a truly random number to be generated. Such applications include encryption, identification, access control and audio (to generate noise). Random number generating circuits for generating random numbers are well known. The most common of these circuits are based on the noise property of a biased semiconductor device or other circuit components. Some circuits use oscillators and rely on the natural variation in the frequency of slow oscillators to control the sampling of faster oscillators.

One difficulty in generating a random number using noise is the fact that an integrated circuit, whether analog or digital, is essentially designed to be deterministic in nature; for a given set of inputs, there will be a given set of outputs. The one parameter of integrated circuits that is truly random is the thermal noise. However, since the thermal noise constitutes a relatively small signal, it must be amplified to be utilized as a random noise source. However, this presents some difficulty in that any on-chip amplifier is subject to interference from other portions of the circuit, i.e., interference through the power supply or the substrate. This interference, as compared to the thermal noise, is not random. The interference is primarily determined by the operation of other parts of the circuits. It can either be periodic, if it is generated from a clock circuit, or it can be data dependent, if it is generated from data processing circuitry. Thus, conventional digital circuits which utilize noise to generate random numbers are somewhat deterministic, resulting in the output of a conventional digital circuit to be predictable in nature. However, the output of a random number generator should be truly random rather than deterministic. This feature makes conventional random number generators difficult to design, build, and test using standard digital circuitry techniques. Accordingly, what is needed is a system and method for generating random numbers in a chaotic and non-deterministic manner.

SUMMARY OF THE INVENTION

The present invention provides a system and method for optically generating random numbers in a chaotic manner. The optical random number generator includes an optical interferometer having a chaotic output which is dependent upon temperature fluctuations in its surrounding micro-environment. The interferometer receives light from a light source, splits the received light between a pair of temperature-sensitive optical paths, and interferes the split light traveling on the pair of optical paths to generate an output signal. The power of the interferometer output signal is measured and compared with a threshold value in order to generate a random number based on the measured interferometer output power.

The optical random number generator assigns a random number based on the relationship between the measured interferometer output power and the threshold value. The half power point of the interferometer output power is preferably initially selected as the threshold value, since the interferometer output power response will fluctuate sinusoidally about the half power point with changes in phase shift. The interferometer phase shift will change with temperature fluctuations in the surrounding micro-environment which causes the interferometer output power to fluctuate accordingly. Thus, the resulting generated random numbers will also change along with these temperature fluctuations and will not be predictable in practice. The threshold value may also be monitored and altered as a moving average of recent interferometer output power measurements in order to maintain a threshold value having a substantially equal chance of being either above or below the measured interferometer output power.

Chaotic behavior in the interferometer output power is achieved by making the interferometer phase shift extremely sensitive to temperature fluctuations, where small changes in the temperature of the interferometer micro-environment will alter the output power of the interferometer. Temperature sensitivity of the phase shift in the interferometer is achieved utilizing a pair of optical paths having different lengths. The lengths of the optical paths are selected to achieve the desired temperature sensitivity. Alternatively, temperature sensitivity can be achieved through the use of pyroelectric material in the interferometer for generating electric fields which act on the light traveling through the optical paths in response to temperature fluctuations.

BRIEF DESCRIPTION OF THE DRAWINGS

The exact nature of this invention, as well as its objects and advantages, will be readily appreciated upon reference to the following detailed description when considered in conjunction with the accompanying drawings, in which like reference numerals designate like parts throughout the figures thereof, and wherein.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a chaotic optical random number generator.

Figure 1:
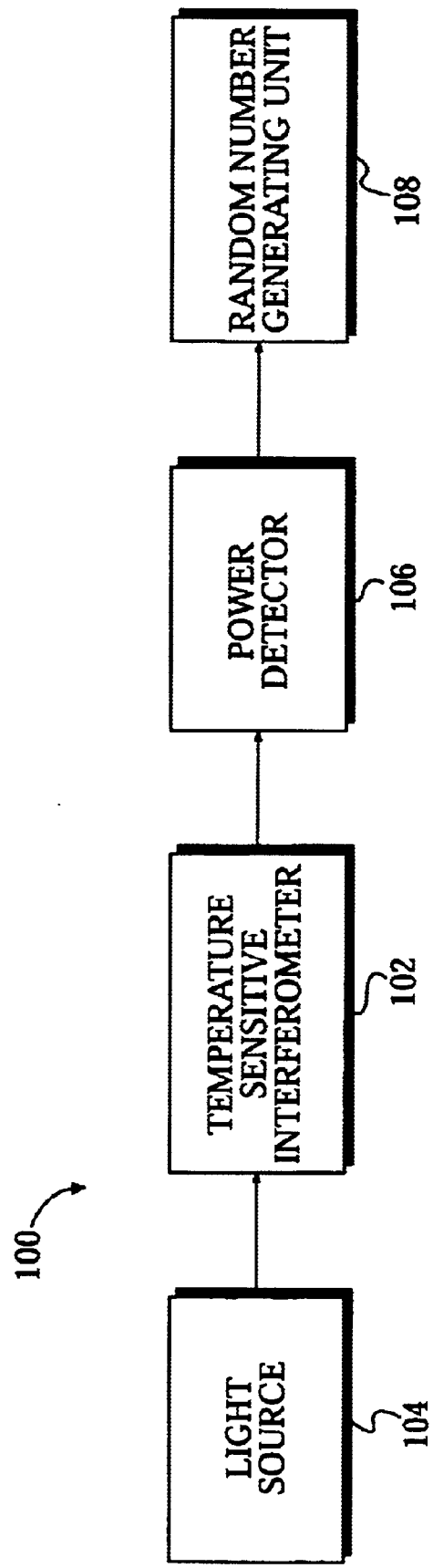
FIG. 1 is a block schematic view of a preferred embodiment of a chaotic random number generator formed in accordance with the present invention.

Referring now to FIG. 1, a block schematic illustration of a preferred embodiment of a chaotic random number generator (RNG) 100 formed in accordance with the present invention is shown. The RNG 100 includes an interferometer 102 which receives light from a light source 104. The interferometer 102 includes a pair of optical paths extending there through which act as a waveguide for the received light, where the interferometer 102 splits the received light into two light beams and transmits the split light beams onto respective optical paths in the pair of optical paths. The optical paths within the interferometer 102 create a phase shift between the split light beams, so that the split light beams are interfered with each other when they are combined after traveling through their respective optical paths. The interfered light beams are output by the interferometer 102 as an interferometer output signal.

The optical paths of the interferometer 102 are designed to be extremely sensitive to temperature fluctuations, and very small changes in temperature will result in changes in the phase shift between the split light beams. These changes in the phase shift between the interfered light beams will alter the power of the interferometer output signal. The RNG 100 includes a power detector 106 for detecting the power of the interferometer output signal. A random number generating unit 108 then compares the measured power of the output signal with a threshold value and generates a random number based upon the relation between the output signal power and the threshold value. When the output signal power is above the threshold value, the random number generating device 108 assigns a number, such as a logic "1", as the generated random number. The random number generating device 108 assigns another number, such as a logic "0", as the generated random number when the output signal power is below the threshold value. A logic "1" or logic "0" is generated when it is desired to generate a random binary number. However, it is understood that the principles of the present invention could be extended to assign any value as the generated random number. Furthermore, a plurality of different threshold values could exist for generating a plurality of possible random numbers.

The random number generating unit 108 may comprise a hardware component which compares the detected power against the threshold value and outputs either a logic "1" or logic "0", depending upon whether the detected power is above or below the threshold value. The threshold value may be set at a predetermined value or adaptively determined, where the threshold value may be set either via hardware or software. Further, the random number generating unit 108 may be implemented in software which controls a local microprocessor to perform the above-described functions of the random number generating unit 108.

Figure 2:
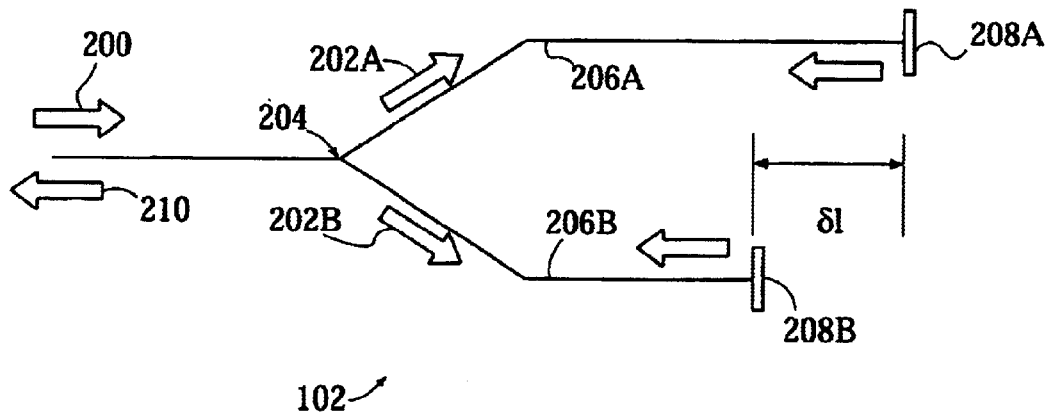
FIG. 2 is a schematic view of a preferred embodiment of an interferometer in the chaotic random number generator of FIG. 1.

Referring now to FIG. 2, a schematic view of a preferred embodiment of the interferometer 102 of the present invention is illustrated. The interferometer 102 may comprise any type of thermally-sensitive two beam interferometer, including but not limited to Michelson interferometers and Mach-Zehnder interferometers. The interferometer 102 is an optical interferometer preferably formed from fiber optics, integrated optics, bulk optics, or the like. The interferometer 102 splits the light 200 received from light source 104 into two equal light beams 202a, 202b with an optical splitter 204, such as a 3 dB splitter or Y junction waveguide, a 50—50 optical coupler, or other similar device. The interferometer 102 includes a pair of optical paths 206a, 206b for respectively transmitting the split light beams 202a, 202b. The optical paths 206a, 206b are preferably formed to possess unequal lengths with a length differential (δl). A phase shift φ(T) between the light beams 202a, 202b is introduced by the length differential (δl) between the optical paths 206a, 206b. Reflectors 208a, 208b reflect light beams 202a, 202b back through optical paths 206a, 206b to optical splitter 204 where they are combined to interfere with each other and produce an interferometer output signal 210. Depending upon the phase shift φ(T) between light beams 202a, 202b, the combined light beams 202a, 202b will either interfere constructively or destructively. As such, the intensity of the interferometer output signal 210 produced by the interference of the combined light beams 202a, 202b is sensitive to the phase shift φ(T) between the light beams 202a, 202b.

Figure 4:
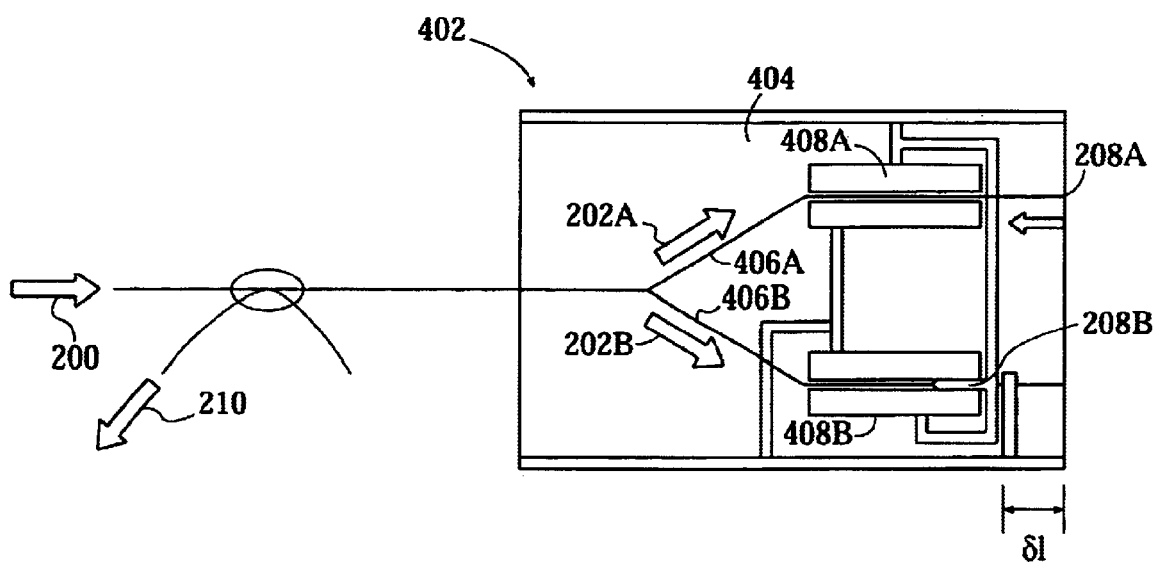
FIG. 4 is a schematic view of another preferred embodiment of an interferometer in the chaotic random number generator of FIG. 1.

Furthermore, interferometers having unequal optical paths are very sensitive to temperature fluctuations, where temperature changes of a milli or micro ° C. can cause π radians of phase shift φ(T) between the light beams 202a, 202b. Thus, the phase shift φ(T) between the light beams 202a, 202b is extremely sensitive to the temperature of the environment surrounding the optical paths 206a, 206b. The change in phase per change in temperature (δφ/δT) determines the chaotic nature of the interferometer 102. The output of the interferometer 102 is more chaotic with larger values of δφ/δT. When implementing the interferometer 102 in a Lithium Niobate chip having an interferometer path length difference, δl, of 1 cm and an operating wavelength of 1300 nm, as shown in FIG. 4, the change in phase per change in temperature equals:

$$\frac{\delta\phi}{\delta T} \approx 2^5 \frac{\text{bits}}{m^\circ C}$$

where phase is measured in units of bits, and one bit is equal to π radians of phase shift. The lengths of optical paths 206a, 206b and their length differential (δl) may be chosen to provide the desired degree of temperature sensitivity for the interferometer phase shift φ(T).

Figure 3:
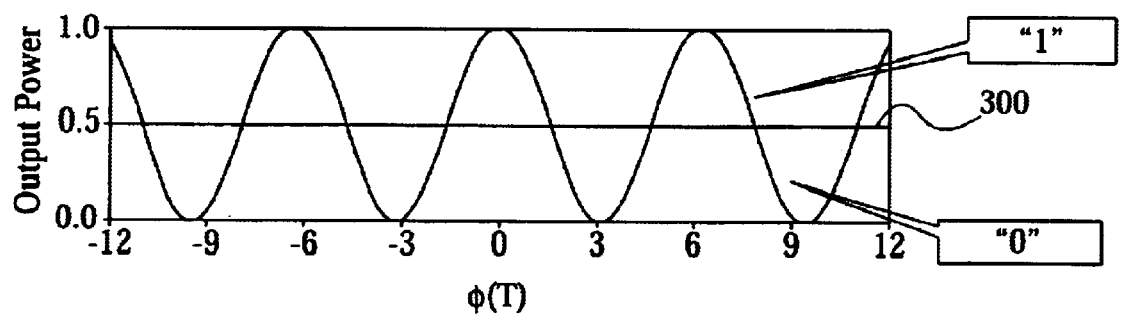
FIG. 3 is a graphical illustration of the output power of the interferometer as a function of phase shift in accordance with a preferred embodiment of the present invention.

The present invention utilizes the sensitivity of the interferometer phase shift φ(T) to minute temperature fluctuations in the surrounding environment to generate a chaotic interferometer output signal 210. The interferometer output signal 210 is fed through an optical path to a power detector 106, such as a photodiode receiver or other similar device, where the power of the output signal 210 is measured. A graphical illustration of the power of the output signal 210 as a function of the interferometer phase shift φ(T) is shown in FIG. 3. As can be seen, the interferometer response will sinusoidally fluctuate about the half power point, indicated by line 300, with changes in phase shift φ(T). The measured power of the output signal 210 can be described by the following equation:

$$P_{chaotic} = \frac{P_O}{2}[1 + \cos(\phi(T))]$$

where,
$P_{chaotic}$=chaotic output power 210
$P_O$=power of received light 200

The power detector 106 samples the interferometer output signal 210 to measure its power at a sampling rate τ which is much longer than a time period required for the phase shift φ(T) to change by π radians. The measured power of the output signal 210 is then compared with a threshold value to determined whether the measured power is above or below the threshold value. In order to provide the highest degree of chaotic random results, the threshold value should be selected to be a value which the power of the output signal 210 fluctuates both above and below equally. As such, the threshold value in the preferred embodiment of the present invention is selected to be the half power point 300, where $P_{chaotic}=P_O/2$. When the random number generating unit 108 determines that the measured power $P_{chaotic}$ is larger than the half power point, a logic 1 is assigned and output as the generated random number. When the random number generating unit 108 determines that the measured power $P_{chaotic}$ is smaller than the half power point, a logic 0 is assigned and output as the generated random number. In this manner, as the phase shift φ(T) fluctuates in response to temperature fluctuations, the power ($P_{chaotic}$) of the interferometer output signal 210 will fluctuate about its half power point. By assigning either a logic 1 or a logic 0 based upon whether the power ($P_{chaotic}$) of the interferometer output signal 210 is above or below its half power point, a chaotic random number is generated in response to chaotic fluctuation of the output signal 210 about its half power point. This process of assigning a logic "1" or logic "0" can be repeated to generate a random bit stream.

Situations could arise where the temperature conditions of the surrounding environment could cause the power ($P_{chaotic}$) of the interferometer output signal 210 to be either consistently above or consistently below the half power point. In these situations, the same number would be consistently assigned as the generated random number, thus removing the random and chaotic nature of the RNG 100. In order to prevent the RNG 100 from becoming deterministic, another preferred embodiment of the present invention is provided where the random number generating unit 108 monitors the degree of randomness of the generated random number and adjusts the operation of the RNG 100 to maintain an equal distribution of interferometer output power measurements both above and below the threshold value. One manner of adjusting the RNG 100 operation may include using a moving average of a predetermined number of prior interferometer output power measurements as the threshold value. In this manner, the threshold value would be constantly updated and adjusted to reflect the average value of the most recent interferometer output power measurements. Another manner of adjusting the RNG 100 operation may include adjusting the intensity of the light 200 emitted from the light source 102 to ensure the interferometer output signal power fluctuates evenly about the selected threshold value. Furthermore, the RNG 100 operation may also be adjusted using other known methods of adjusting phase shifts within an interferometer. Any of the above described methods or combination thereof for adjusting the RNG 100 operation to control the interferometer output power measurements may be utilized in this preferred embodiment of the present invention to maintain interferometer output power measurements to evenly fluctuate about a threshold value to ensure chaotic random numbers are generated by the RNG 100.

In order to further sensitize the effects which fluctuations in the temperature of the surrounding environment will have on the phase shift φ(T), another preferred embodiment of the present invention provides an interferometer 402 made from a pyroelectric material 404 in which the optical paths 406a, 406b are formed, as illustrated in the schematic view of FIG. 4. When the temperature of a pyroelectric material 404 is changed, a voltage differential across the pyroelectric material 404 is created which, in turn, generates an electric field across the optical paths 406a, 406b via electrodes 408a, 408b. By positioning the electrodes 408a, 408b adjacent to at least one of the optical paths 406a, 406b, the electric field created by the pyroelectric material 404 via electrodes 408a, 408b will act on the respective light beam passing through the optical path so as to alter the phase shift φ(T) of the interferometer 402. As the surrounding temperature of the interferometer fluctuates even minutely, the electric field created by the pyroelectric material 404 will fluctuate accordingly to alter the phase shift φ(T). A suitable material for pyroelectric material 404 is lithium niobate ($LiNbO_3$), where the interferometer 402 is formed on a lithium niobate ($LiNbO_3$) chip in a preferred embodiment of the present invention. However, the inventors of the present invention fully recognize that other pyroelectric materials may be utilized as well. Furthermore, the lengths of the optical paths 406a, 406b actually formed in the pyroelectric material 404 may also be variably selected to further control the temperature sensitivity of the interferometer 402.

In order to maximize the sensitivity of the phase shift φ(T) of the interferometer 402 to temperature fluctuations, the interferometer 402 may utilize the pyroelectric material 404 in combination with optical paths 206a, 206b having a length differential (δl), as shown in FIG. 4. However, it is also possible to form the interferometer 402 with optical paths 406a, 406b having equal lengths, where only the pyroelectric material 404 is utilized to alter the phase shift φ(T) with temperature variations. The electrodes 408a, 408b may be positioned adjacent to either one or both of the optical paths 406a, 406b.

Figure 5:
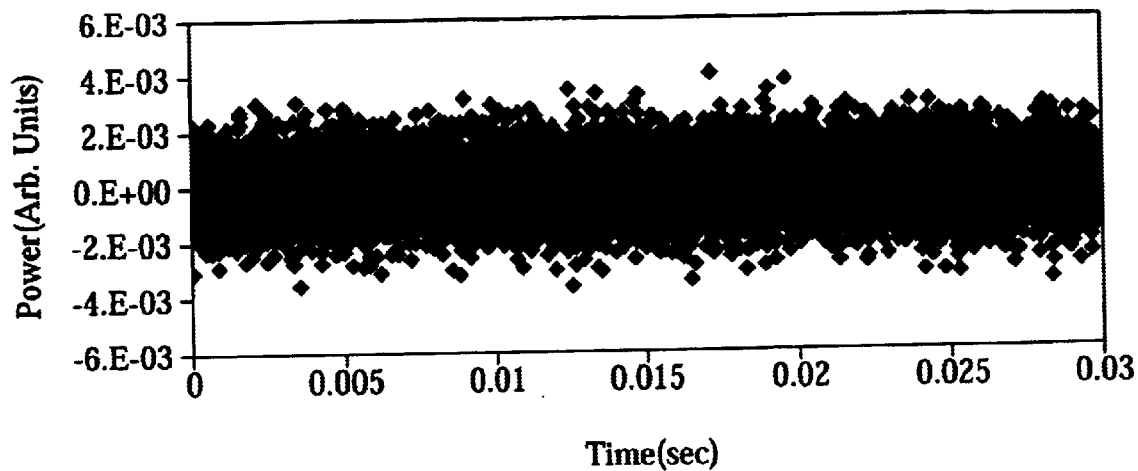
FIGS. 5 and 6 are graphical illustrations of the output power of the interferometer resulting from tests performed on a sample preferred embodiment of the present invention.
Figure 6:
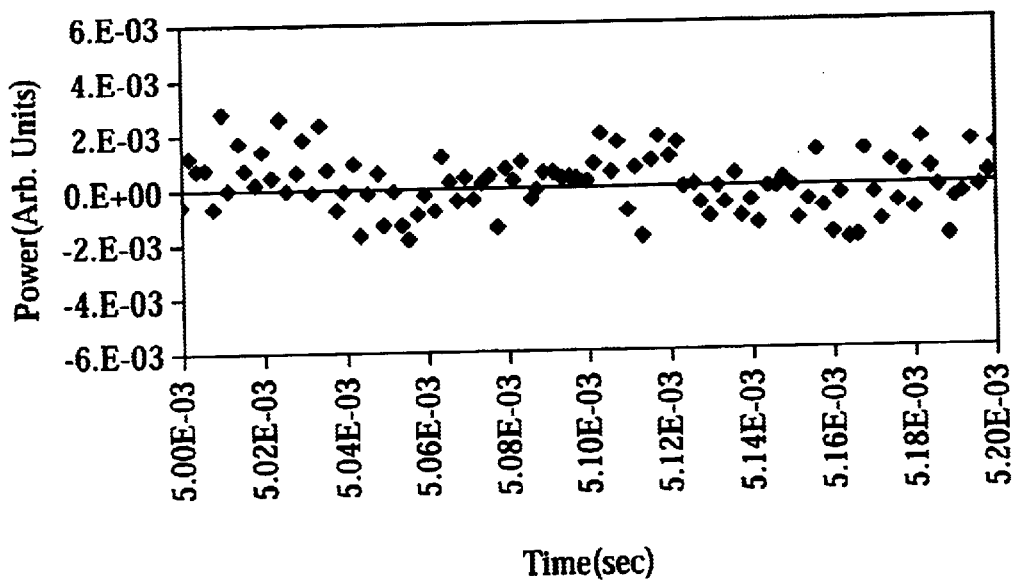

Several tests were performed using a chaotic optical RNG 100 formed in accordance with the interferometer 402 of FIG. 4 of the present invention which verified the chaotic and random nature of the interferometer output signal power. The interferometer tested was formed using a lithium niobate chip having an interferometer path length difference, δl, of 1 cm and an operating wavelength of 1300 nm. FIG. 5 illustrates the measured chaotic output power of the test interferometer, where it can seen that the measured interferometer output power was substantially uniformly distributed around the threshold value (0.E+00), indicating a truly random output was obtained. In another test of 100 interferometer output power measurements where a moving average was utilized as the threshold value, it can be seen from the results of this test illustrated in FIG. 6 that the measured interferometer output power was again substantially evenly distributed around the threshold value. The following chart shows the data obtained from 5 test runs performed on the same optical random number generator formed in accordance with the present invention:

|  | RNG TESTED | IDEAL RESULTS |
| --- | --- | --- |
| Average | 0.5005 | 0.5000 |
| Std Dev | 0.5000 | 0.5000 |
| SD Mean | 0.0041 | 0.0041 |
| Sum | 7458 | 7450 |
| Count | 14900 | 14900 |
| Skew | −0.0021 | 0.0000 |
| Kurtosis | −0.0023 | 0.0001 |

These test results are described merely for the purpose of illustrating the truly random behavior achieved by the random number generator 100 of the present invention and are not intended to encompass all possible settings with which the present invention may be operated.

As can be seen, the present invention provides a chaotic optical random number generator which mains a high degree of randomness using minute temperature fluctuations of the surrounding environment. Thus, the random number generator of the present invention is dependent on its surrounding micro-environment and is not predictable in practice. Chaotic behavior is achieved by making the interferometer phase shift extremely sensitive to temperature fluctuations.

In each of the above embodiments, the different structures of the chaotic optical random number generator are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An optical random number generator, comprising:
   an interferometer for receiving light from a light source and splitting the received light between a pair of temperature-sensitive optical paths, interfering the split light traveling on the pair of optical paths and generating an output signal;
   a power measuring device for measuring the power of the output signal by sampling the output signal to produce a plurality of discrete power values; and
   a random number generating device for serially generating a plurality of random numbers based on the plurality of discrete power values.

2. The optical random number generator of claim 1, wherein said pair of optical paths have different lengths in order to introduce a phase shift between the split light traveling on the pair of optical paths, wherein the length differential between the optical paths is selected to control the sensitivity of the introduced phase shift to temperature fluctuations.

3. The optical random number generator of claim 1, wherein said optical paths of said interferometer are formed in a pyroelectric material.

4. The optical random number generator of claim 3, wherein at least one electrode pair is positioned in said pyroelectric material adjacent to at least one of said optical paths.

5. The optical random number generator of claim 3, wherein said pyroelectric material is lithium niobate.

6. The optical random number generator of claim 3, wherein said pair of optical paths have different lengths to introduce a phase shift between the split light traveling on the pair of the optical paths, wherein the length differential between the optical paths is selected to control the sensitivity of the introduced phase shift to temperature fluctuations.

7. The optical random number generator of claim 1, wherein said power measuring device measures the power of the interferometer output at a sampling rate, $\tau$, which is longer than a time required to change phase by $\pi$ radians.

8. The optical random number generator of claim 1, wherein the random number generating device compares the measured power of the output signal with a threshold value and assigns a logic 1 as the generated random number when the measured power is above the predetermined threshold value or assigns a logic 0 as the generated random number when the measured power is below the predetermined threshold value.

9. The optical random number generator of claim 8, wherein the threshold value is an average value of a plurality of output signal power measurements measured by the power measuring device.

10. The optical random number generator of claim 9, wherein the threshold value is a moving average which is adjusted over time.

11. The optical random number generator of claim 8, wherein the threshold value is the half power point of the interferometer output signal.

12. A method of optically generating a stream of unpredictable random numbers, comprising:
    receiving light from a light source and splitting the received light between a pair of temperature-sensitive optical paths in an interferometer;
    interfering the split light traveling on the pair of optical paths and generating an interferometer output signal;
    measuring the power of the interferometer output signal; and
    generating a stream of unpredictable random numbers based on the measured power of the interferometer output signal.

13. The method of claim 12, further comprising introducing a phase shift between the split light traveling on the pair of optical paths by providing a length differential between the optical paths, wherein the length differential between the optical paths is selected to control the sensitivity of the introduced phase shift to temperature fluctuations.

14. The method of claim 12, further comprising fabricating said optical paths in a pyroelectric material.

15. The method of claim 14, further comprising positioning at least one pair of electrodes in said pyroelectric material adjacent to at least one of said optical paths.

16. The method of claim 14, wherein said pyroelectric material is lithium niobate.

17. The method of claim 14, further comprising introducing a phase shift between the split light traveling on the pair of optical paths by providing a length differential between the optical paths, wherein the length differential between the optical paths is selected to control the sensitivity of the introduced phase shift to temperature fluctuations.

18. The method of claim 12, wherein said power of the interferometer output is measured at a sampling rate, $\tau$, which is longer than a time required to change phase by $\pi$ radians.

19. The method of claim 12, wherein the random number generating step further comprises comparing the measured power of the output signal with a threshold value and assigning a logic 1 as the generated random number when the measured power is above the predetermined threshold value or assigning a logic 0 as the generated random number when the measured power is below the predetermined threshold value.

20. The method of claim 19, further comprising computing the threshold value as an average value of a plurality of output signal power measurements.

21. The method of claim 19, further comprising adjusting the threshold value to correspond to a moving average of output signal power measurements.

22. The method of claim 19, wherein the threshold value is the half power point of the interferometer output signal.

* * * * *